United States Patent [19]

Evans

[11] 4,103,301
[45] Jul. 25, 1978

[54] CONSTANT FALSE ALARM RATE MOVING TARGET INDICATION RADAR SYSTEM (CFAR-MTI)

[75] Inventor: Norol T. Evans, San Pedro, Calif.

[73] Assignee: Hughes Aircraft Company, Culver City, Calif.

[21] Appl. No.: 588,577

[22] Filed: Jun. 20, 1975

[51] Int. Cl.² .............................................. G01S 9/42
[52] U.S. Cl. .................................................... 343/7.7
[58] Field of Search .......................................... 343/7.7

[56] References Cited

U.S. PATENT DOCUMENTS

| | | | |
|---|---|---|---|
| 3,706,989 | 12/1972 | Taylor, Jr. ......................... | 343/7.7 X |
| 3,742,500 | 6/1973 | Freedman .............................. | 343/7.7 |
| 3,745,571 | 7/1973 | Chwastyk et al. ..................... | 343/7.7 |
| 3,860,924 | 1/1975 | Evans ................................... | 343/7.7 |

Primary Examiner—Malcolm F. Hubler
Attorney, Agent, or Firm—Martin E. Gerry; Paul H. Ware; W. H. MacAllister

[57] ABSTRACT

A constant false alarm rate (CFAR) moving target indication (MTI) radar system, operable in various electronic countermeasures (ECM) environments is disclosed. A modified Dicke-Fix circuit is used to drive the MTI. Operation of the invention results in automatic restoration of signal level out of a filter. Thus the invention provides a CFAR-MTI that is not degraded significantly by swept jammers and is not captured by off-frequency jammers.

21 Claims, 5 Drawing Figures

CONSTANT FALSE ALARM RATE MOVING TARGET INDICATION RADAR SYSTEM (CFAR-MTI)

CROSS-REFERENCES TO RELATED APPLICATIONS

PD-73375 "CFAR Doppler System" filed concurrently herewith Ser. No. 588,576: filing date June 20, 1975.

BACKGROUND OF THE INVENTION

1. Field of the Invention

This invention relates generally to radar systems and more particularly to moving target indication systems exhibiting constant false alarm rate in various kinds of jamming (ECM) environments.

2. Description of the Prior Art

Electronic countermeasures, commonly referred to as jamming, presents a serious problem to MTI radar systems. The jamming energy causes oscillatory disturbances known as ringing in the MTI circuits due to the delay units used in the MTI.

It is well known in the art that the doppler frequency shift resulting from a relative velocity between radar and target may be used either in pulse, or continuous-wave radar to distinguish fixed targets from those in motion. However, the distinction of moving targets in itself is not the only nor is it the most important benefit to be gained from the extraction and employment of doppler imformation. It is also well known in the art that even when the return or echo from fixed targets called clutter, is orders of magnitude greater, say 20 to 50 db, than the moving target echo, MTI radars can nevertheless discern the moving target through utilization of doppler information. These advantages stem from the basic physical observation that echo signals from fixed targets will not undergo a frequency shift while the echo from a target exhibiting a relative velocity $v_r$ will be frequency shifted in an amount $f_d$ described by the relation $$f_d = 2v_r/\lambda$$

where $\lambda$ is the radar wavelength. Detection of moving targets has been reported even when the target echo has been up to 70 db below the clutter echo.

Observation of moving targets vis-a-vis stationary targets may be made by watching the video output in a radar receiver system on an A-scope. Observation of successive sweeps reveals that echoes from fixed targets do not vary appreciably, however, echoes from moving targets do vary predictably from sweep to sweep in amplitude at a rate related to the doppler frequency. Superposition of successive sweeps results in an A-scope display that distinguishes the moving targets. Such superposition, while effective for distinguishing moving targets on an A-scope, is not, however, suitable for PPI display.

One method for processing doppler information so as to render it suitable for PPI display is through the implementation of a delay-line canceler. The delay-line canceler in its simiplest form, rejects the fixed target returns and passes the returns from moving targets. In performing this function, received video information is fed to two separate channels in one of which the video signal is time delayed by one pulse repetition period. The outputs from the two channels are then subtracted one from the other thus eliminating the constant amplitude signals of echoes received from fixed targets and preserving an uncanceled residue signal resulting from the subtraction of the pulse-to-pulse varying echoes received from moving targets. Output from the subtractor in an ideal system will only be produced by moving targets.

Most MTI systems are more susceptible to jamming than other kinds of receivers because the jamming energy rings the MTI circuits due to the delay units used in the MTI.

SUMMARY OF THE INVENTION

A constant false alarm rate (CFAR) moving target indication (MTI) radar system according to the invention provides CFAR-MTI in various kinds of jamming or electronic countermeasures (ECM) environments. It has been noted that MTI systems, because of the incorporated delay units, are peculiarly susceptible to various kinds of jamming. It would be of great benefit to the radar art to provide a moving target indication system that maintains improved sensitivity and CFAR action in all types of jamming environments.

It is thus an object of the present invention to provide a CFAR-MTI radar system acceptably operable in various kinds of ECM.

It is a further object of this invention to provide a CFAR-MTI radar system which will not suffer from either off-frequency capture or clutter capture.

DESCRIPTION OF THE PREFERRED EMBODIMENT

Figure 1:
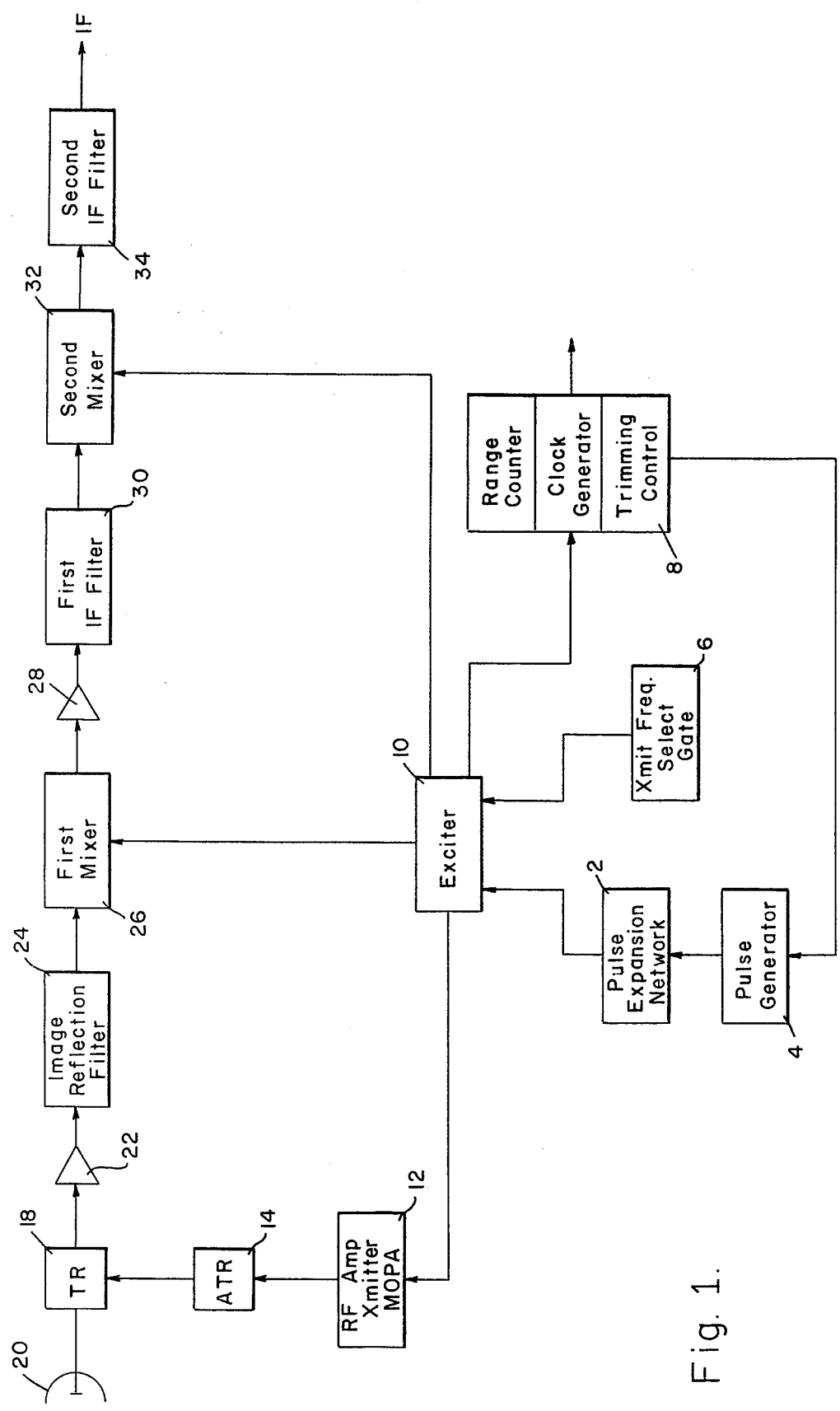
FIG. 1 is a simplified block diagram of the front end of a conventional radar system.

Referring first to FIG. 1, the front end of a conventional pulse radar system is shown. The transmitted pulse is conventionally developed through the action of the exciter 10 responding to pulse expansion network 2, pulse generator 4 and transmitter frequency select gate 6 and furnishing local oscillator output signals to first mixer 26 and second mixer 32. The exciter 10 also furnishes output signal to Range Counter-Clock Generator-Timing Control 8, and the Master Oscillator Power Amplifier (MOPA) chain 12. The pulse so derived is then applied to the antenna via ATR 14 and TR 18 and radiated into space via antenna 20. Assuming a target within the range of the radar system, the return echo therefrom will be applied typically through the antenna 20 and the transmit-receive (TR) switch 18, preamplified in preamplifier 22 and then processed through image rejection filter 24. Conventional first and second IF amplifications are then accomplished by the actions of first mixer 26, amplifier 28 and first IF filter 30, second mixer 32 and second IF filter 34.

Figure 2:
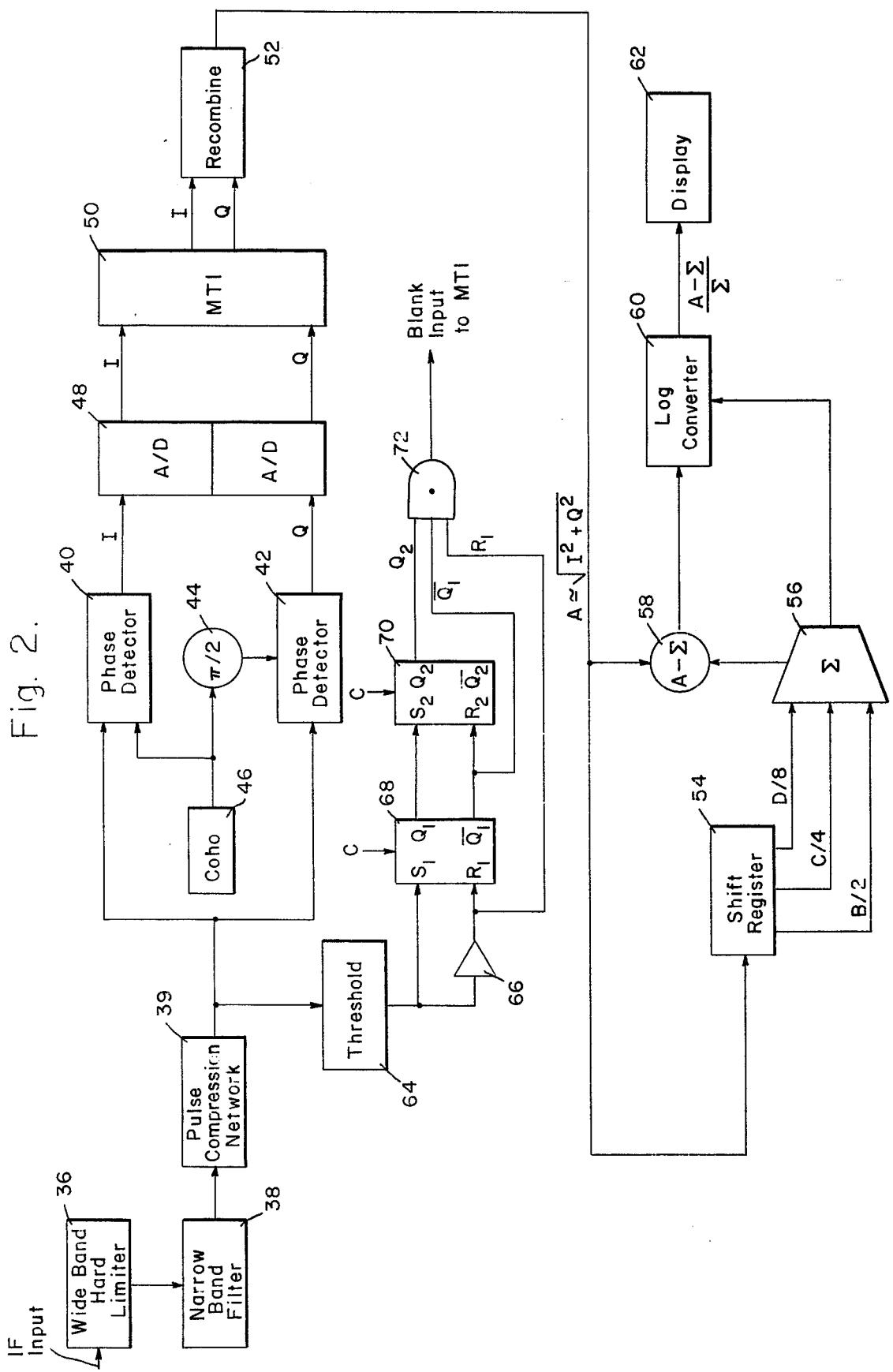
FIG. 2 is a simplified block diagram showing a continuation from FIG. 1 of a conventional radar system but in addition including the details of the invention.

Referring now to FIG. 2, the action of the Dicke-fix like circuit used to drive the MTI will be explained. This receiver, using a wide-band, hard-limiter is sometimes named after Dicke. References: *Radar Handbook* by M. I. Skolnik, McGraw-Hill, 1970, pp 5–31 — 5–38; *Radar Design Principles* by F. E. Nathanson, McGraw-Hill, 1969, pp 119–130. Before describing the circuit used in the invention it may be instructive to explain the operation of a conventional Dicke-Fix receiver. It will be convenient in that connection to present some typical numerical values in order to further clarify the explanation. The normal Dicke-Fix receiver comprises a wideband amplifier with a bandwidth, for example, of 20 megahertz followed by a hard limiter, limiting well into the noise, followed in turn by an optimum bandwidth linear amplifier with a bandwidth of say 300 kilohertz for a 2.0 microsecond pulse width mode. Since the hardlimiter limits below its wideband noise level, its output consists of constant noise or signal level above the noise level. The noise level in the narrow-band channel will be decreased from the wideband noise level by the wide bandwidth-to-narrow bandwidth ratio, whereas there will be no reduction in the amplitude of a pulse whose width is matched to the narrow band filter. This ratio turns out to be approximately 66:1 or about 18 db for the 2.0 microsecond pulse mode. This result means that no matter how large a signal may be at the input to the receiver, it will only be 18 db at most above the normal noise level at the narrow-band output. Even though the signal-to-noise ratio during the signal pulse may be very large thus suppressing the noise during the pulse, the noise level before and after the pulse is only 18 db below the maximum pulse amplitude. The normal Dicke-Fix receiver responds to different types of jamming in different ways. The major disadvantage of the Dicke-Fix receiver manifests itself in the receiver's response to off-frequency CW jamming. CW jamming off-frequency, but within the wideband bandwidth will suppress the output by the same number of db that the CW jamming is above the wideband noise level. This is called jam capture. On-frequency CW jamming will saturate the narrowband channel causing large numbers of false alarms and signal suppression. Broadband noise jamming will reduce receiver sensitivity but will not increase the false alarm rate. Swept jamming, so disastrous to most other receiver types, is combatted very effectively in the normal Dicke-Fix receiver. If, for instance, a swept jammer sweeps over a 100 megahertz bandwidth every 5 microseconds, this would cause false alarms every 5 microseconds in most other type receivers. In the Dicke-Fix receiver, signal suppression occurs during the time the jammer is within the 20 megahertz bandwidth of the wideband limiter, that is, for 1 microsecond every 5 microseconds and for the other 4 microseconds, normal sensitivity would prevail. Since the swept jammer only appears in the 300 kilohertz narrow-band channel for about 0.02 microseconds, the mismatch is so great that no false alarms will occur. Pulse jamming that is slightly off frequency does not affect the Dicke-Fix receiver because the hard limiter places an upper limit on the signal-to-noise level into the narrow band filter of 18 db in our example. As a result, signals at frequencies other than the IF center frequency are suppressed by the filter bandpass characteristic. A signal that is attenuated by the filter skirts by the ratio of the wideband-to-narrow band width, or greater, is at or below the output noise level. For instance, assume a pulse jammer with a signal-to-noise ratio of +40 db that is off-frequency enough to allow a +20 db pulse through the linear and the logarithmic channel. The output of the narrow-band channel of the Dicke-Fix receiver will only be suppressed by 40–18 or 22 db during this pulse interval. Consequently, pulse jamming must be on-frequency and reasonably matched to the narrow-band channel to cause false alarms in the Dicke-Fix receiver.

Figure 5:
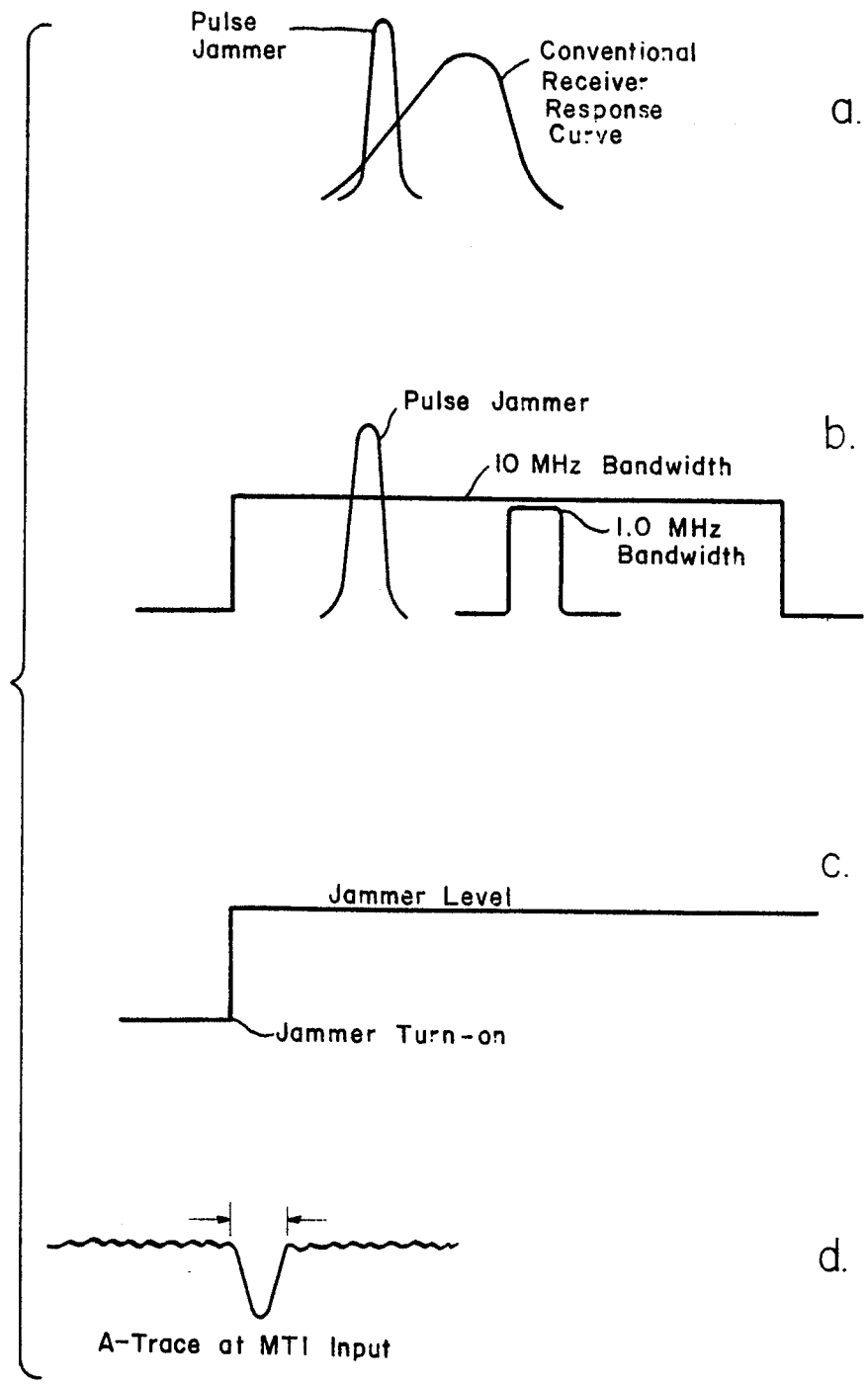
FIG. 5 illustrates off-frequency jamming and the responses exhibited by prior art systems as compared to responses obtained from systems incorporating the present invention.

Still referring to FIG. 2, the CFAR system of the invention in which a Dicke-Fix like circuit is used to drive the MTI may be explained showing that unlike a conventional Dicke-Fix circuit, the system of the invention will not suffer from either off-frequency capture of the hard limiter or clutter capture of the hard limiter. To explain this effect it is convenient to use some typical parameters. Assume the wide-band hard limiter 36 has a 10 megahertz bandwidth and the narrow-band matched filter 38 has a 1.0 megahertz bandwidth. The ratio of these two bandwidths defines the dynamic range of the Dicke-Fix receiver as:

$$10 \log 10/1.0 = 10 \text{ db}$$

at the output of the narrow-band filter 38. When large signals outside the narrow-band filter but inside the wide-band limiter exist, as in FIG. 5 at curve (*b*) they will capture the limiter. This capture causes the noise or signal level out of the narrow-band filter 38 to decrease below the normal receiver noise level. We define the jamming-to-noise level of the jamming over the 10 megahertz noise bandwidth and when this is, for instance, +15 db, then the signal and noise out of the narrow-band filter 38 will be 15 db below normal. An improvement in dynamic range may be realized through the implementation of a pulse compression network 39. With pulse compression techniques there may be obtained, for example, through utilization of a 10 db pulse compression ratio gain, an additional 10 db of dynamic range. Large clutter, greater than 10 db signal-to-noise ratio, can also capture the limiter and, in a conventional system, the MTI residue will be reduced in db by the amount the clutter exceeds the 10 db dynamic range of the Dicke-Fix receiver.

A conventional coherent oscillator (coho) 46, supplies the reference signals for the system in the form of a direct signal to phase director 40 and a signal shifted 90° by phase shifter 44 to phase detector 42. Phase detectors 40 and 42 also receive the output signal from the narrow-band filter 38 via pulse compression network 39 and process this signal with the coho signals to form the in-phase (I) and quadrature (Q) signal components applied to A/D converters 48.

The first step to overcome the limiter capture problem is to provide large dynamic range analog-to-digital (A/D) converters 48 and set their maximum level to the maximum hard limiter output which is well defined by convention as 6 db per bit. For example, assume A/D converters with 8 bits plus sign which give a total dynamic range of 48 db. This means that with no signal or jamming present, the quantization into the receiver noise has the value $$48 - 10 \text{ or } 38 \text{ db.}$$

Next assume an MTI 50 consisting of an in-phase (I) and quadrature (Q) double canceller followed by a recombining network 52. After recombination, the maximum amplitude is an 11-bit number, that is, 8 bits as a result of A/D processing, then 9 bits resulting from 1 canceler and 10 bits resulting from the double canceler and then 11 bits resulting from I and Q recombination. This signal is now processed through a digital FTC circuit comprising shift register 54, summer 56 and subtractor 58 where A represents the present range bin, B represents the most recent range bin, C the next most recent and D the next most recent before C. A is compared with the sum of the amplitudes of the contents of B divided by two, C divided by four and D divided by eight. The difference, that is:

$$A - (B/2) + (C/4) + (D/8)$$

obtained from the subtractor is then sent to the log converter 60. The sum $(B/2) + (C/4) + (D/8)$ is also sent to the log converter 60 where the logarithm to the base 2 of the ratio of the difference to the sum is computed. The resultant signal is then furnished to display processing system 62.

The log converter 60 is implemented in the following manner. First the most significant digit of the sum signal is determined then, based on the location of this most significant digit, the difference signal is divided by some integral power of 2 requiring right or left shifting by some selected amount. The desired logarithm number has five bits of mantissa and its characteristic is in the sixth position and up as indicated in Table 1. For Example suppose:

$$\frac{B}{2} + \frac{C}{4} + \frac{D}{8} = \frac{A = 11{,}000{,}000{,}000}{10{,}000{,}000{,}000}$$
$$\text{Difference} = 1{,}000{,}000{,}000$$

now since the log of this difference signal should be about 3 db, it is apparent that the difference signal should be right shifted six positions. The appropriate log conversion table is given in Table 2. After the difference signal has been shifted it is in a logarithm format, but it is not in the conventional binary logarithm format that is used on the other channels. The six most significant digits of the characteristic are decoded as shown in Table 1. The sum of the decoded values is computed to get the binary logarithm number. For instance the number 101 after decoding becomes 100 as:

101 becomes 18 + 0 + 6 = 24 db its decoded value is 301
the sum of the decoded values gives:

| | |
|---|---|
| 3 becomes binary | 011 |
| 0 becomes binary | 000 |
| 1 becomes binary | 001 |
| | 100 |

The above process causes the CFAR - MTI receiver to behave exactly like a Dicke-Fix log receiver in jamming and yet achieve clutter cancellation down to either the receiver noise level or the in-band jamming level which ever is larger when both clutter and jamming are present.

Figure 3:
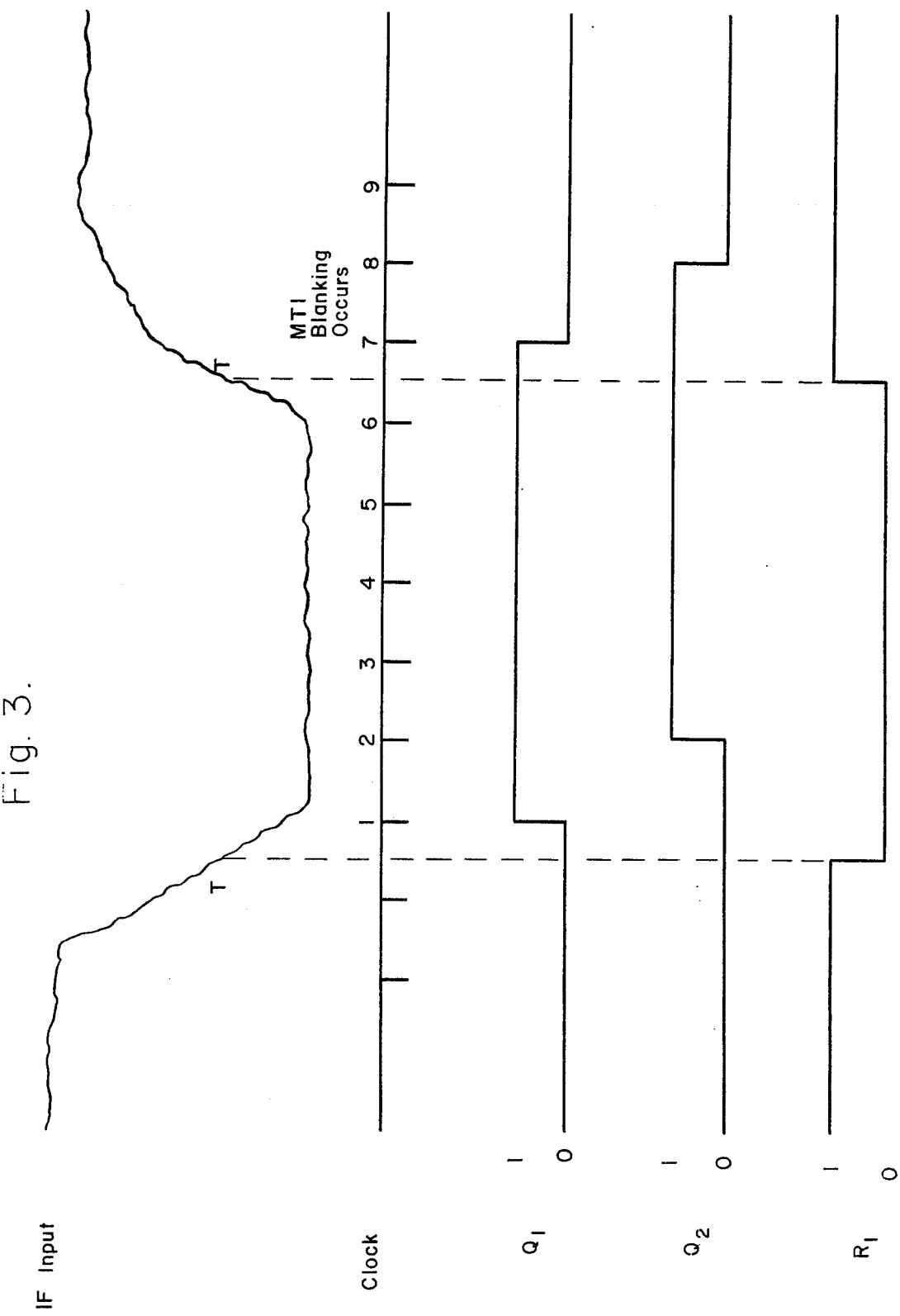
FIG. 3 comprises input signal and response curves, helpful in an understanding of the operation of the invention.

The signal output from narrow-band filter 38 is concurrently applied to phase detectors 40 and 42 via pulse compression network 39 as heretofore noted and also to a MTI blanking circuit comprising thereshold circuit 64, inverter 66, clocked flip-flops 68 and 70 and logical AND gate 72. Referring now to FIG. 3 the operation of the MTI blanking circuit of FIG. 2 will be examined.

Threshold circuit 64 maintains a 0 output as long as the input signal to it does not fall, in our example, by 5 db or more. The composite input signal to AND gate 72 under this condition is:

$Q_2 = 0$
$\overline{Q}_1 = 1$
$R_1 = 1$

Thus there will be no blanking signal applied to the MTI. Whenever the input signal to threshold circuit 64 falls to a predetermined level, here for our example, −5 db, the output signal from threshold circuit 64 changes from 0 to 1 thereby making the set input $S_1$ of flip-flop 68 true or one and the reset input $R_1$, because of the action of inverter 66, becomes false or zero. However, since flip-flop 68 is a clocked flip-flop, it cannot change state until it receives a clock pulse. Upon receipt of the clock pulse labeled 1 in FIG. 3, $Q_1$ of flip-flop 68 assumes the 1 state and therefore $\overline{Q}_1 = 0$. The composite input signal to AND gate 72 is now:

$Q_2 = 0$
$\overline{Q}_1 = 0$
$R_1 = 0$ thus there will still be no blanking signal applied to the MTI. $Q_2$ cannot change state until the next clock pulse. Upon receipt of the second clock pulse labeled 2 in FIG. 2, we have $S_1$ still equal to one, $Q_1$ still equal to one and $Q_2$ now becoming 1. The composite input signal to AND gate 72 is now:

$Q_2 = 1$
$\overline{Q}_1 = 0$
$R_1 = 0$ so still there is no blanking signal applied to the MTI. This condition of signal input to AND gate 72 will be maintained until the signal pulls up to and above the threshold level of typically −5 db. This state of affairs occurs in FIG. 3 between clock pulses 6 and 7. $R_1$ immediately assumes the 1 state since the output of threshold circuit 64 is now zero whence $S_1$ is also zero so that through the action of inverter 66, $R_1 = 1$. However, the flip-flop 68 cannot change state until the clock pulse is received, in this instance, clock pulse number 7 in FIG. 3. Upon receipt of the clock pulse, since $R_1$ is true or one, $\overline{Q}_1$ become true or one and $Q_2$ remains true or one. The composite input signal to AND gate 72 is now:

$Q_2 = 1$
$\overline{Q}_1 = 1$
$R_1 = 1$ thus applying a blanking signal to the MTI. This blanking signal from AND gate 72 will only be applied for one clock pulse since upon receipt of the clock pulse labeled 8 in FIG. 3 $Q_2$ will assume the false or zero state thus making the composite input signal to AND gate 72 become:

$Q_2 = 0$
$\overline{Q}_1 = 1$
$R_1 = 1$ and hence supplying no blanking signal as output of AND gate 72. A blanking signal to the MTI of this kind is required because when the IF signal level input decreases, the receiver sensitivity decreases for a short period of time, however, when the IF signal level increases, the receiver perceives this increase as the presence of a target and therefore, absent a blanking signal, the system is presented with a false alarm.

Figure 4:
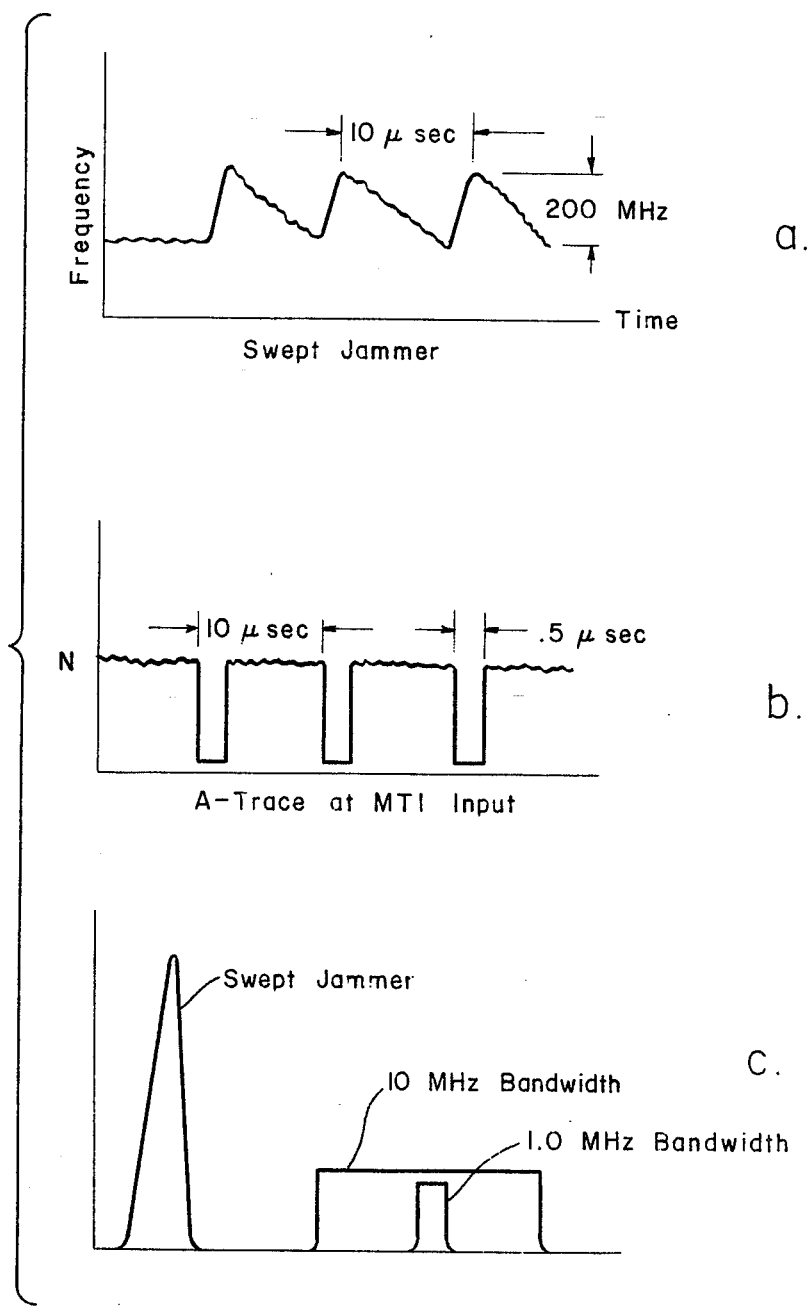
FIG. 4 comprises graphical illustrations of swept jamming and the response thereto.

In summarizing the response of the CFAR-MTI system of the invention it is interesting to consider some specific forms of often encountered electromagnetic counter measures, (ECM) or jamming. Under the influence of a broadband noise jammer, the noise level in the conventional receiver varies considerably thus causing numerous false alarms. On the contrary, due to the hard limiter incorporated into the system of the invention, the receiver noise level remains constant regardless of the input jamming level unless the jamming level before the hard limiter is some number, say N db, above the normal receiver level in the narrow-bandwidth filter in which case the receiver sensitivity is reduced by N db. It is to be emphasized that the jamming noise must be in the narrow-bandwidth filter for this latter sensitivity reduction to occur. If the ECM environment encountered comprises a swept jammer, as indicated at FIG. 4(a) sweeping, for example, over a 200 megahertz radio frequency bandwidth once every 10 microseconds at say +60 db above rms noise, a conventional receiver would give a very large, say of the order of +40 db above noise, false alarm pulse every 10 microseconds thus rendering the receiver totally ineffective. In the system as exemplified by the invention, this swept jammer causes no output or sensitivity loss when it is outside the wide bandwidth hard limiter assumed to be 10 megahertz for the sake of example and as shown in FIG. 4c. If, however, the jammer is within the wide band hard limiter but outside the 1 megahertz narrow band filter as indicated at FIG. 5b, a signal suppression will be suffered once every 10 microseconds for a period of about 0.5 microseconds as shown in FIG. 4b so that for a period of time given by $$0.5 \text{ microseconds}/10 \text{ microseconds} = 0.05 = 5\%$$

of the time the system will be desensitized and the other 95% of the time the system of the invention will exhibit normal sensitivity as also indicated in FIG. 4b. In case the ECM environment encountered is a pulse jammer there are three cases to consider.

Case 1 — Pulse outside the wideband hardlimiter

In the conventional receiver a normal response curve for which is shown at FIG. 5a along with a pulse jammer curve, pulses will be attenuated 20 to 40 db but large pulses will still cause false alarms. On the other hand, because of the limiting action of the invented system, no pulse of this kind would get through the receiver.

Case 2 — Pulse inside the wideband hard limiter but outside the narrow band filter as indicated at FIG. 5(b)

A conventional receiver will attenuate a pulse such as this only a few db, say 10 to 20 db, so very large pulses will cause false alarms. In the receiver as exemplified by the invention, the noise at the output of the narrow band filter will be reduced by about 60 db during the length of the pulse. The trailing edge of this pulse may be detected by the FTC circuit in the output, however, its effect will be greatly attenuated by the action of the blanking circuit at the output of the narrow band filter 38 FIG. 2.

Case 3 — Pulse inside the narrow band filter

A conventional receiver would give a large pulse of the order of 60 db whereas the system of the invention would give a pulse of about 10 db due to the limiting action. It should be noted that such pulse matching to the narrow band filter is highly unlikely.

In the final case to be considered here of off-frequency narrow band jamming, the jamming signal and the response curve of a conventional receiver are indicated in FIG. 5(a). If the jamming is, for instance, +30 db above noise, the conventional receiver will be desensitized by 25 or more db. On the other hand, the system of the invention will suffer no degradation as apparent from FIG. 5(b) except when the jammer is first turned on FIG. 5c and then for only a period of about $2\tau$ as indicated at FIG. 5(d), where $\tau$ is radar pulse width.

There has thus been described a constant false alarm rate — moving target indication (CFAR - MTI) radar system capable of effective operation in various kinds of electronic countermeasures (ECM) environments.

TABLE 1

| 1 | 1 | 1 | 1 | 1 | 1 | . | 1 | 1 | 1 | 1 | 1 | Quantity |
|---|---|---|---|---|---|---|---|---|---|---|---|---|
| 36 | 30 | 24 | 18 | 12 | 6 | | 3 | 3/2 | 3/4 | 3/8 | 3/16 | db |
| 6 | 5 | 4 | 3 | 2 | 1 | | | Characteristic decoded value | | | | |

TABLE 2

| ΣMSD POSITION | SHIFT DIFFERENCE POSITIONS | |
|---|---|---|
| 11 | Right | 6 |
| 10 | " | 5 |
| 9 | " | 4 |
| 8 | " | 3 |
| 7 | " | 2 |
| 6 | " | 1 |
| 5 | | 0 |
| 4 | Left | 1 |
| 3 | | 2 |
| 2 | | *2 |
| 1 | | *2 |

*These shifts are not increased because the data would get to noisy.

What is claimed is:

1. A constant false alarm rate, moving target indicator radar system comprising in combination:
    a recombining network responsive to both in-phase and quadrature signal outputs from a moving target indicator and forming therefrom output signal functionally related to said in-phase and quadrature signals;
    a shift register responsive to output signal from the recombining network and forming functionally related output signals therefrom;
    a summing circuit responsive to output signals developed in the shift register and forming a functionally related output signal therefrom;
    a substractor circuit responsive to output signals from the summing circuit and the recombining network and forming a functionally related output signal therefrom;
    a log converter circuit responsive to output signal from said summing circuit and said subtractor circuit and furnishing input signals functionally related thereto to display processing elements of the radar system.

2. The system of claim 1 including a wide-band, hard-limiter circuit responsive to an intermediate frequency signal developed in the radar system.

3. The system of claim 2 including a narrow-band filter circuit responsive to signal developed in said wide-band, hard-limiter circuit.

4. The system of claim 3 including a first phase detector circuit responsive to signals, at least one of which signals is developed in the narrow-band filter circuit and another signal developed in a coherent oscillator circuit of the radar system.

5. The system of claim 4 including a quadrature phase shifter responsive to and operating upon said another signal developed in a coherent oscillator circuit of the radar system.

6. The system of claim 5 including a second phase detector circuit responsive to signals, at least one of which signals is developed in said narrow-band filter circuit and another signal developed in said quadrature phase shifter.

7. The system of claim 6 including a first analog-to-digital converter responsive to in-phase signal developed as output signal from said first phase detector circuit.

8. The system of claim 7 including a second analog-to-digital converter responsive to quadrature signal developed as output signal from said second phase detector circuit.

9. The system of claim 8 including a moving target indicator system responsive to and developing both in-phase and quadrature signals developed as output signals respectively from said first and second analog-to-digital converters, the developed output in-phase and quadrature signals therefrom being indicative of moving targets.

10. The constant false alarm rate, moving target indicator radar system of claim 3 including a radar receiver system in which dynamic range of said receiver system equals essentially the ratio of bandwidths of said wide-band, hard-limiter circuit to said narrow-band filter circuit.

11. The system of claim 10 in which the bandwidth of said wide-band, hard-limiter circuit is of the order of 10 to 100 times the bandwidth of the narrow-band filter circuit.

12. The constant false alarm rate, moving target indicator radar system of claim 3 including a radar receiver system in which dynamic range of said receiver system equals essentially the sum of the ratio of bandwidths of said wide-band, hard limiter circuit to said narrow-band filter circuit and the compression ratio of a pulse compression network.

13. The constant false alarm rate, moving target indicator radar system of claim 5 wherein said quadrature phase shifter is capable of shifting the phase of input signal by at least 90°.

14. The constant false alarm rate, moving target indicator radar system of claim 8 wherein the maximum level of said first and second analog-to-digital converters is at least equal to the maximum output of said wide-band limiter circuit output.

15. The constant false alarm rate, moving target indicator radar system of claim 9 wherein said moving target indicator system is a digital moving target indicator system.

16. The constant false alarm rate, moving target indicator radar system of claim 1 wherein said recombining network output signal functionally related to said in-phase and quadrature signals is of the form of the square-root of the sum of the squares of the in-phase and quadrature signals.

17. The constant false alarm rate, moving target indicator radar system of claim 1 wherein said recombining network output signal functionally related to said in-phase and quadrature signals is of the form of the sum of the in-phase signal plus a multiple of the quadrature signal when the in-phase signal is larger than the quadrature signal and is of the form of the sum of a multiple of the in-phase signal plus the quadrature signal when the quadrature signal is larger than the in-phase signal.

18. The constant false alarm rate, moving target indicator radar system of claim 1 wherein said shift register output signals have the form of half the signal contents of the most recent range bin, one-fourth the signal contents of the next most recent range bin and one-eighth the signal contents of the previous next most recent range bin.

19. The constant false alarm rate, moving target indicator radar system of claim 1 wherein said summing circuit output signal has the form of the sum of the signal outputs from said shift register.

20. The constant false alarm rate, moving target indicator radar system of claim 1 wherein said subtractor circuit output signal has the form of the difference obtained by subtracting output signal of said summing circuit from output signal of said recombining network.

21. The constant false alarm rate moving target indicator radar system of claim 1 wherein said log converter circuit output signal has the form of the ratio of the output signal from said subtractor circuit to the output signal from said summing circuit.

* * * * *